United States Patent [19]

Gitlin et al.

[11] 3,755,738

[45] Aug. 28, 1973

[54] PASSBAND EQUALIZER FOR PHASE-MODULATED DATA SIGNALS

[75] Inventors: Richard Dennis Gitlin, Monmouth Beach; Edmond Yu-Shang Ho, Englishtown; James Emery Mazo, Fair Haven, all of N.J.

[73] Assignee: Bell Telephone Laboratories Incorporated, Murray Hill, N.J.

[22] Filed: May 1, 1972

[21] Appl. No.: 249,219

[52] U.S. Cl. .................... 325/42, 325/65, 333/18 R

[51] Int. Cl. .................................... H03h 7/36

[58] Field of Search ................ 325/42, 65; 328/155, 328/165; 333/18 R

[56] References Cited

UNITED STATES PATENTS 3,508,172 4/1970 Kretzmer et al. ................ 333/18 R 3,593,142 7/1971 Freeny et al. ........................ 325/42

*Primary Examiner*—Benedict V. Safourek

*Attorney*—W. L. Keefauver

[57] ABSTRACT

An adaptive transversal equalizer for differentially coherent phase-modulated data transmission systems employs a tapped delay line provided with complete sets of in-phase and quadrature weighting attenuators operating on time-spaced samples of passband signals appearing at each tap. Tap signals selectively adjusted by the respective sets of attenuators are combined after a quadrature phase shift of one set to form the equalized output signal. Control signals for adjusting all attenuators are derived from the mean-square error difference between the actual equalizer output and a predetermined threshold level based on an assumed absolute phase reference angle at the equalizer output.

5 Claims, 3 Drawing Figures

PASSBAND EQUALIZER FOR PHASE-MODULATED DATA SIGNALS

FIELD OF THE INVENTION

This invention relates to the correction of the distorting effects of transmission media of limited frequency bandwidth on digital data signals and in particular to the rapid automatic equalization of phase-modulated data signals.

BACKGROUND OF THE INVENTION

Equalization is defined as the compensation of a communication channel for distorting amplitude and delay characteristics by means of an adjustable device whereby the resultant composite characteristics become substantially constant in amplitude and linear in phase over a chosen frequency band. Equalization of communication channels for single-sided or baseband amplitude-modulated signals has been accomplished automatically in accordance with the teachings of F. K. Becker et al United States Pat. No. 3,292,110 issued Dec. 13, 1966 by means of the transversal time-domain filter. These teachings have been extended to the equalization of dual-channel signals amplitude modulated on quadrature phases of a single carrier wave in J. F. O'Neill, Jr., et al United States Pat. No. 3,400,332 issued on Sept. 3, 1968. In the latter patent, staggered interchannel timing is specified to minimize interchannel interference. These prior-art equalizers for amplitude-modulation channels operate satisfactorily as long as linear relationships are preserved in the modulation process.

A phase-modulated line signal, however, is a nonlinear function of the modulating baseband signal. Consequently, equalization of phase-modulated baseband signals cannot be accomplished through amplitude control alone. The additional parameter of phase must be taken into account. True phase modulation differs from prior-art amplitude-modulated quadrature channel systems in that every signal transmitted has components in each of the quadrature channels. While tap attenuator incrementation in accordance with independent zero-level slicing operations on the demodulated outputs of the respective quadrature channels was possible in the system taught by O'Neill et al, in true phase-modulation systems there is no direct relationship between the polarity of demodulated data and channel distortion.

In the copending United States patent application of H. C. Schroeder et al. Ser. No. 199,693 filed Nov. 17, 1971, a differentially coherent phase-modulated channel signal is equalized in a transversal equalizer for which error information is derived from the departure of demodulated phase angle changes between both adjacent and nonadjacent received phase angles from predetermined discrete values in accordance with a zero-forcing algorithm. The delay-line tap signals on the equalizer are selectively attenuated by separate in-phase and quadrature sets of weighting attenuators whose outputs are combined in quadrature to form the equalized signal. In order to obtain phase angle differences from partially demodulated data signals between nonadjacent signaling intervals, it is necessary to provide storage for a plurality of consecutive measured phase changes so that leading and lagging distortion associated with each signaling element can be compensated. In effect an error signal is provided for each tap on the equalizer.

It is an object of this invention to base automatic and adaptive equalization of phase-modulated data transmission on a common mean-square error criterion.

It is another object of this invention to control an automatic transversal equalizer independently of demodulated data or phase angle information in a phase-modulated data transmission system.

It is a further object of this invention to control an automatic transversal equalizer for a phase-modulated data transmission system in accordance with an error difference between actual equalizer outputs and a threshold level assumed for an ideal output.

SUMMARY OF THE INVENTION

The above and other objects are accomplished according to this invention in a transversal filter structure having first and second delay lines each with a plurality of synchronously spaced taps for respective inphase and quadrature-phase received signal components, a pair of adjustable attenuators associated with each tap on the first delay line effectively divided into in-phase and quadrature-phase branches, first and second 90° phase shifters in series respectively with the second delay line and the attenuated tap signals in the quadrature-phase branch, and combining means for signals selectively attenuated in each of the two branches and rotated through 90 degrees in the quadrature-phase branch. It is to be noted that attenuators are provided in pairs at all taps including the reference tap. The signal traversing the equalizer in each of the delay lines is the passband line signal on which the transmitted data are differentially encoded in the phase of a carrier wave. During each signaling or band interval the absolute phase is maintained substantially constant.

The adjustment of the attenuators in the respective in-phase and quadrature branches is effected according to a mean -square error criterion through the medium of control signals derived from correlations of individual tap signals with a common error signal. Because the two delay lines are separated in phase by 90° respective tap signals experiencing a common delay are in relative quadrature phase. The resultant of the tap signals incident at a given time at corresponding in-phase and quadrature-phase taps defines a tap vector. The tap signals correlated with the common error signal for the respective in-phase and quadrature-phase attenuators are therefore taken from taps on the appropriate delay line, while all the attenuated signals applied to the combining means are taken from the in-phase delay line.

The error signal is obtained by slicing, i.e., comparing with a threshold level, the combined equalizer output at preselected positive and negative levels that correspond to an arbitrary ideal composite output signal whose quadrature-related components are equal. The correlation of the common error signal with the tap signals on the respective delay lines accordingly results in an equalization of the magnitudes of the respective components of the received signal and in effect rotates the phase angle of the received signal vector toward a multiple of 45° measured from the phase of the original unmodulated carrier wave. Viewed from another standpoint it may be said that the tap vectors, or simply the taps themselves, are being rotated with respect to each other so that the phase of the ideal equalized output is constrained to discrete odd multiples of 45°.

It is a feature of this invention that a nonlinear modulation system is equalized at passband level independently of the demodulation process.

It is a further feature of the invention that equalizer control information in a phase modulation data transmission system is obtained directly from the equalizer output by a single threshold slicing operation.

It is a further feature of the invention that delay-line storage of received signal information only is required. No storage need be provided for previously demodulated phase-angle differences or digital data.

DESCRIPTION OF THE DRAWING

The above and other objects and features of this invention will be more fully appreciated from a consideration of the following detailed description and the drawing in which.

DETAILED DESCRIPTION

Reference is made in the first instance to Chapter 10 of *Data Transmission* by W. R. Bennett and J. R. Davey (McGraw-Hill Book Company, 1965) for details of the differential encoding of serial binary data in dibit pairs on four discrete phases of a carrier wave of fixed frequency. Specifically, FIG. 10-1 on page 202 is of present interest.

Briefly, for four-phase modulation serial data bits to be transmitted are paired into dibits and through appropriate logic circuitry discrete phase angle changes are imparted to the carrier wave in odd multiples of 45 electrical °. Dibits are encoded as the difference in phase between successive signaling intervals, the last transmitted absolute phase being taken as a reference phase for the next encoded phase difference. A typical encoding scheme relates the leftmost or A bit of a dibit pair to the polarity of a received signal vector with respect to the in-phase axis and the rightmost or B bit to the received-signal polarity with respect to the quadrature-phase axis.

Figure 1:
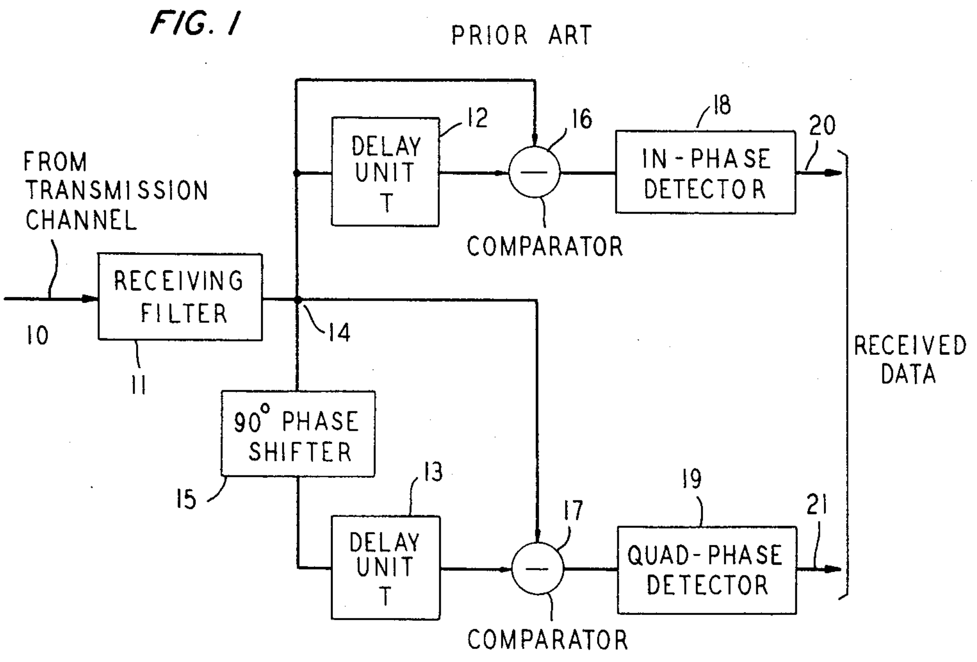
FIG. 1 is a block diagram of a known receiver for a representative differentially encoded phase-modulated data transmission system to which this invention is applicable.

FIG. 1 illustrates in functional block schematic form a representative receiver for a differentially encoded phase-modulation data transmission system. The receiver broadly comprises receiving filter 11, in-phase and quadrature-phase delay units 12 and 13, 90° phase shifter 15 in series with delay unit 13, comparators 16 and 17 (shown diagrammatically as encircled minus signs) in the respective in-phase and quadrature-phase channels, and in-phase and quadrature-phase detectors 18 and 19.

Phase-modulated signals of the type previously described are taken from a transmission channel, such as a voice telephone channel, and applied by way of lead 10 to receiving filter 11. The channel signal is a constant frequency wave whose phase changes during synchronous data intervals between odd multiples of 45°. The absolute phase remains substantially constant throughout each data interval of length T seconds. The principal purpose of receiving filter 11 is to constrain the signaling channel bandwidth to avoid interchannel crosstalk and to block out-of-band noise. Filter 11 may also perform an equalizing, i.e., amplitude- and delay-distortion compensation, function.

The bandlimited output of filter 11 is split at junction 14 into two paths in each of which the immediate ($n$th) signal phase is compared with the prior ($n$-1) signal phase. Specifically, in the upper path the immediate phase is subtracted in comparator 16 from the prior phase stored in delay unit 12, whose delay is T seconds. The result of the comparison is the polarity or sense of the A bit, which is converted into proper digital form on line 20 by in-phase detector 18. Similary, in the lower path the prior signal is rotated in phase 90° in phase shifter 15 before being delayed by T seconds in delay unit 13 and subtracted in comparator 17 from the immediate signal phase available at junction 14. The B bit is obtained from the comparison in the lower path and in turn is transformed into appropriate digital form on lead 21 by the operation of detector 19.

Figure 2:
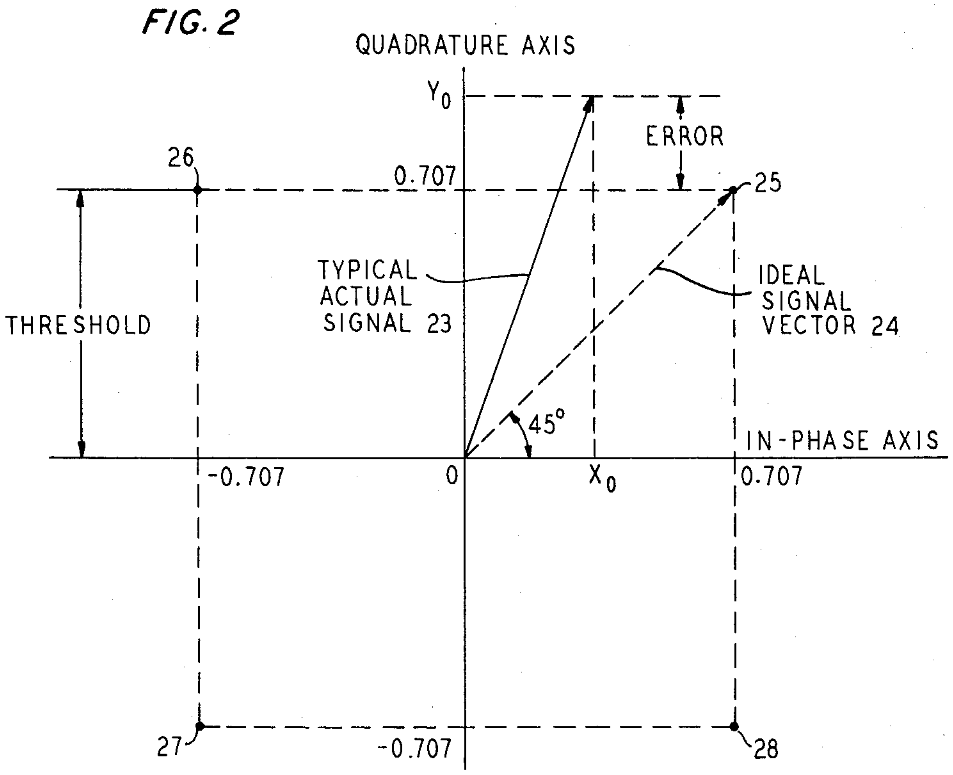
FIG. 2 is a vector diagram useful in explaining the manner in which an error signal for controlling the adaptive transversal equalizer of this invention is derived.

FIG. 2 is a vector diagram showing a typical signal vector 23 received during any given signaling interval. Transmitted signals can occur only at discrete odd multiples of 45 degrees relative to the in-phase axis, as indicated by the broken-line vector connecting the origin with point 25 to encode the dibit 00. Other permitted vectors terminate at points 26, 27 and 28 and, in accordance with the illustrative coding mentioned above, encode respective dibits 01, 11, and 10. Assigning an ideal vector a unit length at a relative 45° angle yields equal-length in-phase and quadrature-phase components of value 0.707. The polarity of the component along the in-phase axis encodes the B-bit and that along the quadrature-phase axis, the A-bit.

Signal vectors transmitted through a distorting channel tend to reach the receiver with both amplitude and phase angle altered as indicated by solid vector 23, which has a foreshortened component $x_0$ along the in-phase axis and a stretched component $y_0$ along the quadrature-phase axis. The phase angle also differs from 45°. An efficient error measure suggests itself from the vector diagram of FIG. 2 in the excess of the $y_0$ component over the ideal 0.707 length. Conceptually, if the received vector is less than 45° the $x_0$ component will exceed 0.707. Accordingly, if an arbitrary reference phase can be assumed and a 0.707 threshold established at 45° positions relative to this phase, the difference between either quadrature-related component and the threshold level yields an error signal which can be correlated with the components of the actual received vector to equalize the respective components by shortening the lengthened component and lengthening the shortened component. In effect the received vector is rotated into the nearest 45° multiple position.

The vector diagram of FIG. 2 can be taken as representative of the overall received signal or as the tap signal observed at each tap of a transversal equalizer.

Figure 3:
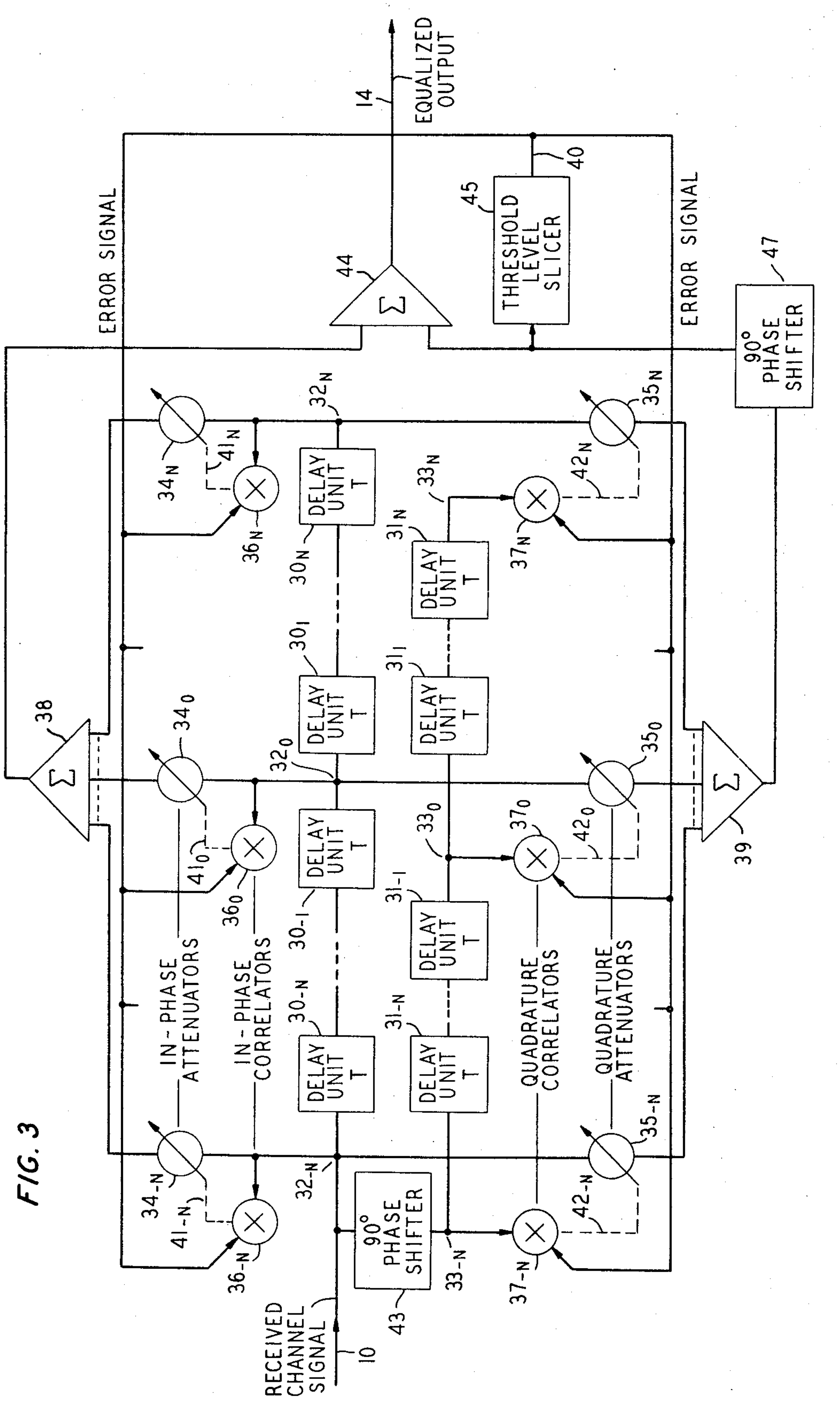
FIG. 3 is a block diagram of an illustrative embodiment of an adaptive transversal equalizer for a phase-modulated data transmission system in accordance with this invention.

FIG. 3 is a block schematic diagram of a transversal equalizer for a phase-modulation data transmission system which exploits the tap vector rotation effect mentioned above. The arrangement of FIG. 3 is assumed to be incorporated in the receiving filter block 11 in the data receiver of FIG. 1. The transversal equalizer of FIG. 3 located between a received channel signal input lead 10 and an equalized output lead 14 comprises a principal and auxiliary delay line each including T-second delay components 30 and 31 separated by taps 32 and 33, adjustable in-phase attenuators 34 connected to taps 32, adjustable quadrature-phase attenuators 35 also connected to taps 32, 90° phase shifter 43 in series with the input $33_{-N}$ to the auxiliary delay line with elements 31, correlators 36 connected to taps 32 on the principal delay line with elements 30, correlators 37 connected to taps 33 on the auxiliary delay line with elements 31, in-phase combining circuit 38, quadrature-phase combining circuit 39, 90° phase shifter 47 in series with the output of combining circuit 39, overall combining circuit 44 and threshold slicer 45. Particular note can be taken that there are both in-phase and quadrature-phase adjustable attenuators at all taps on the principal delay line in contrast to the equalizer of the cited copending Schroeder et al. application which has no quadrature-phase attenuator at the tap selected as the reference tap. A full complement of attenuators is essential in the practice of this invention in order to effect the vector rotation property.

Delay units, taps, attenuators and correlators are further distinguished by subscripts to suggest a system with as many delay elements or taps as are required to effect a chosen level of precision. Generally speaking there will be an even number 2N of delay units and an odd number (2N+1) of taps, attenuators and correlators. The purpose of the auxiliary delay line is to provide quadrature-phase tap signal components for correlation with the common error signal.

Adjustable attenuators 34 and 35 can advantageously be incrementally controlled resistive ladder networks or continuously variable resistances as implemented by field-effect transistors. In either case the range of adjustment typically includes positive and negative values.

Correlators 36 and 37 provide the combined functions of multiplying and averaging. The error signal at the output of threshold slicer 45 multiplies the respective in-phase and quadrature-phase tap signals to form products whose values average over a number of signaling intervals provide directions and magnitudes over broken-line links 41 and 42 for adjustment of attenuators 34 and 35. Where the attenuators are adjusted incrementally, only the polarities of the respective error and tap signals are relevant and correlators 36 and 37 can be Exclusive-OR gates.

Incoming phase-modulated signals to be equalized are applied to the respective delay lines so that a succession of in-phase (directly applied) and quadrature-phase (applied after a 90° rotation in phase) components are available simultaneously. The in-phase components are selectively attenuated by respective in-phase (34) and quadrature-phase (35) attenuators and then combined in quadrature in combining circuit 44 to form the equalized output signal on lead 14. An error signal is generated in threshold slicer 45 as the difference between a threshold level of 0.707 of a normalized overall output vector magnitude on the assumption of a convenient reference phase of 45° and the quadrature component of the signal being equalized as found in the output of 90° phase shifter 47. The error signal is taken as positive when the absolute magnitude of the selected actual received signal component exceeds the threshold level; and negative, otherwise.

The error signal on lead 40 branches to the respective in-phase (36) and quadrature-phase (37) correlators, each of which has as a further input either an in-phase tap signal from the principal delay line 30 or a quadrature-phase tap signal from quadrature-phase auxiliary delay line 31. The resultant attenuator control signals from these correlators operate on the attenuators associated with each tap to cause the sum of the squares of the respective in-phase and quadrature-phase tap coefficients to equal unity. Effectively, the tap signal vectors at the zeroth tap are rotated in phase to achieve the assumed 45° reference phase. At the same time all the other tap signal vectors are adjusted to minimize their contributions to the combined equalizer output in the same manner as a baseband mean-square equalizer.

While the present invention has been described in terms of a specific illustrative embodiment, it is to be understood that its principles are also applicable for example to combined phase and amplitude modulated data transmission systems.

What is claimed is:

1. A transversal equalizer for a phase-modulated data transmission channel causing distorted signals comprising a synchronously tapped delay line accepting distorted signals from said channel;

a pair of adjustable attenuators connected to each tap on said delay line;

a summation circuit for forming an equalized output signal;

means for connecting one of each pair of attenuators directly and the other of each pair through a 90° phase shifter to said summation circuit;

means for developing an error signal from the difference in magnitude between a 90-degree vector component of an actual output signal from said summation circuit and the corresponding vector component of an idealized output signal; and means for correlating said error signal with distorted signals from said channel directly, and with distorted signals phase-shifted by 90 degrees, at each tap on said delay line to generate control signals for the respective ones and others of each pair of said attenuators.

2. The transversal equalizer defined in claim 1 in which a second synchronously tapped delay line in series with a 90° phase shifter provides quadrature-related tap signals for correlation with said error signal to generate control signals for said attenuators connected to said summation circuit through said first-mentioned 90° phase shifter.

3. The transversal equalizer defined in claim 1 in which said means for developing an error signal comprises a comparator with a predetermined threshold level set at the magnitude of the equal quadrature-related components of an ideal phase-modulated reference signal.

4. The transversal equalizer defined in claim 1 in which said means for correlating said error signal with the several distorted signals appearing at taps on said delay line comprises Exclusive-OR gates.

5. An adaptive transversal equalizer for a phase-modulated data transmission channel comprising a first delay line with synchronously spaced taps thereon and having a direct connection to said channel;

a first 90-degree phase-shift circuit accepting signals from said channel;

a second delay line with synchronously spaced taps thereon for receiving phase-shifted channel signals from said first phase-shift circuit;

a first plurality of adjustable attenuators connected to the taps on said first delay line;

first combining means for signals traversing said first plurality of attenuators;

a second plurality of adjustable attenuators connected to taps on said first delay line;

second combining means for signals traversing said second plurality of attenuators;

third combining means for signals traversing said first and second combining means for producing an equalized output signal;

a second 90° phase-shift circuit in tandem between said second and third combining means;

threshold slicing means responsive to signals traversing said second phase-shift circuit for deriving an error signal as the difference between the predetermined threshold level related to the magnitude of equal-length quadrature components of an ideal received signal and signals traversing said second phase-shift circuit;

a first plurality of correlating means having first and second inputs, said first inputs being connected to individual taps on said first delay line for providing control signals to said first plurality of adjustable attenuators;

a second plurality of correlating means having first and second inputs, said first input being connected to individual taps on said second delay line for providing control signals to said second plurality of adjustable attenuators; and means for applying said error signal to the second inputs of said first and second pluralities of correlating means in common.

* * * * *